United States Patent
Lee et al.

(10) Patent No.: US 9,959,824 B2
(45) Date of Patent: May 1, 2018

(54) NARROW BEZEL FLAT PANEL DISPLAY

(71) Applicant: LG Display Co., Ltd., Seoul (KR)

(72) Inventors: Sangwook Lee, Paju-si (KR); Kibok Park, Seoul (KR)

(73) Assignee: LG Display Co., Ltd., Seoul (KR)

(*) Notice: Subject to any disclaimer, the term of this patent is extended or adjusted under 35 U.S.C. 154(b) by 0 days. days.

(21) Appl. No.: 14/864,611

(22) Filed: Sep. 24, 2015

(65) Prior Publication Data
US 2016/0104441 A1  Apr. 14, 2016

(30) Foreign Application Priority Data
Oct. 14, 2014 (KR) .......................... 10-2014-0138624

(51) Int. Cl.
| | | |
|---|---|---|
| *G02F 1/1335* | (2006.01) | |
| *G09G 3/36* | (2006.01) | |
| *F21V 8/00* | (2006.01) | |
| *G02F 1/1343* | (2006.01) | |
| *G02F 1/1345* | (2006.01) | |

(52) U.S. Cl.
CPC ......... *G09G 3/3622* (2013.01); *G02B 6/0083* (2013.01); *G02F 1/13439* (2013.01); *G02F 1/13452* (2013.01); *G02F 2001/13456* (2013.01); *G09G 2300/023* (2013.01)

(58) Field of Classification Search
CPC .. G02F 1/13306; G02F 1/13439; G09F 13/04; G02B 6/0083
USPC ..................................................... 349/62, 150
See application file for complete search history.

(56) References Cited

U.S. PATENT DOCUMENTS

| | | | |
|---|---|---|---|
| 6,211,936 B1 | 4/2001 | Nakamura | |
| 2007/0021007 A1 | 1/2007 | Park | |
| 2011/0102726 A1* | 5/2011 | Nobeoka | G02F 1/13306 349/150 |
| 2011/0187965 A1* | 8/2011 | Ooishi | G09F 13/04 349/62 |
| 2012/0026424 A1* | 2/2012 | Youk | G02B 6/0083 349/62 |
| 2013/0148072 A1* | 6/2013 | Jang | G02F 1/13439 349/150 |

OTHER PUBLICATIONS

European Extended Search Report, European Application No. 15185835.4, dated Mar. 23, 2016, 6 pages.

* cited by examiner

*Primary Examiner* — Abdul-Samad A Adediran
(74) *Attorney, Agent, or Firm* — Fenwick & West LLP

(57) ABSTRACT

A flat panel display includes a display panel comprising a display area and a non-display area which is disposed on a outside of the display area and has at least one recess on one end side thereof; a driving substrate disposed on a rear surface of the display panel; and at least one connection member connected to the display panel and the driving substrate through at least one recess.

9 Claims, 5 Drawing Sheets

(Related Art)

(Related Art)

NARROW BEZEL FLAT PANEL DISPLAY

This application claims the priority benefit of Korean Patent Application No. 10-2014-0138624 filed on Oct. 14, 2014, which is incorporated herein by reference for all purposes as if fully set forth herein.

BACKGROUND

Field

This document relates to a narrow bezel flat panel display, and more particularly to a narrow bezel flat panel display where a space in which a connection member disposed along one end of a thin film transistor substrate is removed.

Related Art

There have been rapid developments in display devices, which include flat panel display devices (FPDs), which are thin and light, and capable of being manufactured to be large-area flat panel displays, and are used to replace a cathode ray tube (CRT) having bulky volume. Examples of the FPD include a liquid crystal display device (LCD), a plasma display panel (PDP), an organic light emitting display device (OLED), an electrophoretic display device (EPD), and the like, among which the LCD displays images by controlling electric fields applied to liquid crystal molecules according to a data voltage. An active matrix type LCD, which may be manufactured with low costs and high performance achieved by the development of processing and operating technologies, is most widely used in applications of almost all display devices ranging from small mobile devices to large televisions.

Recently, with an increasing demand for a flat panel display and with the development of the flat panel display technology, there have been various demands regarding external designs of the LCD from an aesthetic point of view, including an increasing demand for a flat panel display with a reduced bezel area.

As a way of reducing a bezel area, a printed circuit board (PCB) may be disposed on the rear surface of a display panel to thereby reduce a non-display area of the display panel. Hereinafter, a structure of a general liquid crystal display is described by reference to FIGS. 1 and 2. FIGS. 1 and 2 are diagrams illustrating a structure of a general liquid crystal display.

As illustrated by FIG. 1 and FIG. 2, a general LCD includes a display panel LCP, a backlight unit BLU that emits light to the display panel LCP, and a driving unit that drives the display panel LCP.

The display panel LCP includes a thin film transistor substrate TFS on which a display area AA and a non-display area NA are defined, a color film substrate CFS that is disposed on an upper surface of the AA, and a liquid crystal cell LC that is interposed between the thin film transistor substrate TFS and the color film substrate CFS as illustrated by FIG. 2.

A color filter having a pattern of red, green, and blue, or having a pattern of red, green, blue, and white is formed on the color filter substrate CFS. In addition, a black matrix may be further formed thereon.

A plurality of gate lines that are arranged in one direction and a plurality of data lines that are arranged in a direction perpendicular to the gate lines are formed on the thin film transistor substrate TFS. Further, a plurality of pixel electrodes are arranged in a matrix form in a pixel area defined by the intersection of the gate lines and the data lines. A plurality of thin film transistors that are switched according to a signal of the gate lines to transmit a signal of the data lines to each pixel electrode are formed.

A liquid crystal cell LC is driven by a voltage difference between a pixel electrode that charges a data voltage through a thin film transistor and a common electrode to which a common voltage is applied. The common electrode may be formed on the color filter substrate CFS or on the thin film transistor substrate TFS depending on the types of a liquid crystal display.

In order to enable the display panel LCP to perform an optical function, a top polarizer TPOL may be formed on the front surface of the color filter substrate CFS, and a bottom polarizer BPOL may be formed on the rear surface of the thin film transistor substrate TFS. The top polarizer TPOL and the bottom polarizer BPOL are disposed such that light transmission axes thereof cross orthogonal to each other.

The backlight unit BLU is disposed on the rear surface of the display panel LCP, and includes a light source LA that generates light and a light guide plate LG that guides light from the light source LA to the display panel LCP. A reflection sheet REF is disposed on the rear surface of the light guide plate LG, and an optical sheet is disposed on the front surface of the light guide plate LG. The optical sheet OPT may include a diffusion sheet, a prism sheet, or a protective sheet.

A cover bottom CB is disposed on the bottom of the display panel LCP and the backlight unit BLU. The cover bottom CB needs to be formed in a manner that protects and supports the display panel LCP and the backlight unit BLU.

A driving unit that drives the display panel LCP is provided on at least one end side of the thin film transistor substrate TFS. As illustrated by FIG. 1, the driving unit includes a printed circuit board PCB to drive the display panel LCP, and a drive integrated circuit DIC that is electrically connected to the printed circuit board PCB to supply signals to the display panel LCP. The DIC supplies signals to the gate lines or the data lines through a pad unit formed in the non-display area NA of the thin film transistor substrate TFS. The DIC is mounted on the connection member TP. For example, the connection member TP may be a Tape Carrier Package (TCP), in which one side of the connection member TP is connected to the thin film transistor substrate TFS by Tape Automated Bonding (TAB), and the other side thereof is connected to the PCB.

As such, the driving unit and the LCP are formed separately and electrically connected to each other using the connection member (TP). For this configuration, an additional area where the connection member (TP) is able to be mounted is needed. Such an area increases a non-display area (AA), thereby increasing a bezel area.

For the narrow bezel structure, the printed circuit board PCB is disposed on the rear surface of the thin film transistor substrate TFS. As illustrated in FIG. 2, the PCB may be disposed on the bottom of the cover bottom CB. At this point, a case top CTOP is disposed to cover a edge of the color filter substrate CFS, the non-display area NA of the thin film transistor substrate TFS, and the driving unit.

Even in this case, there is limitation in reducing a bezel area by a connection member TP that connects the thin film transistor substrate TFS and the print circuit board PCB. Specifically, the connection member TP is disposed in a manner of bending along the circumference of an end side of the thin film transistor substrate TFS, and thus, there should be a predetermined distance C between the connection member TP and the thin film transistor substrate TFS. In addition, to prevent damage of the connection member TP having ductility properties, there should be a predetermined distance E between the connection member TP and the case top CTOP. Thus, the general liquid crystal display has a limitation in reducing a bezel area. The bezel area degrades the aesthetic quality of a liquid crystal display, so efforts for reducing the bezel area are needed.

SUMMARY

The following description aims to solve the aforementioned problem, and relates to a flat panel display where a connection member, which connects a pad unit of a display panel and a driving unit disposed on the rear surface of the display panel, passes through a recess formed on an end side of a thin film transistor substrate, so that a size of a bezel area may be minimized.

In one aspect, a flat panel display comprises a display panel comprising a display area and a non-display area which is disposed on a outside of the display area and has at least one recess on one end side thereof; a driving substrate disposed on a rear surface of the display panel; and at least one connection member connected to the display panel and the driving substrate through at least one recess.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 3:
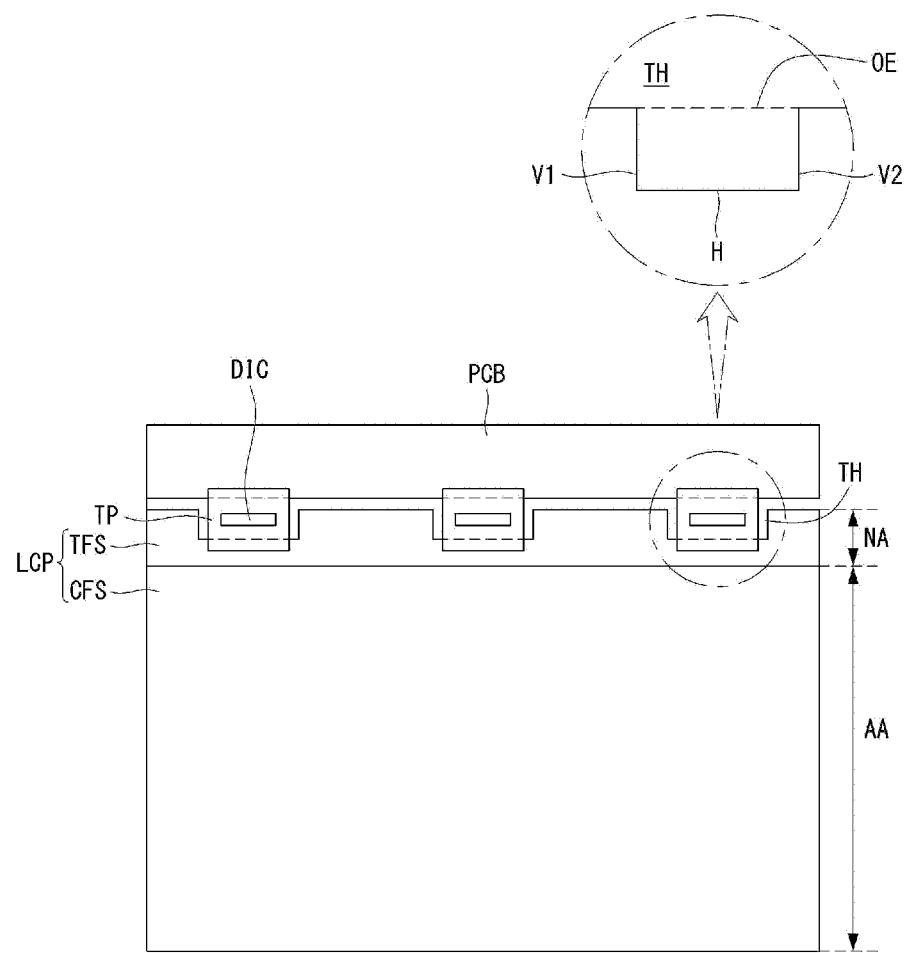
FIGS. 3 and 4 are diagrams illustrating a structure of a liquid crystal display according to the first exemplary embodiment of the present disclosure.
Figure 4:
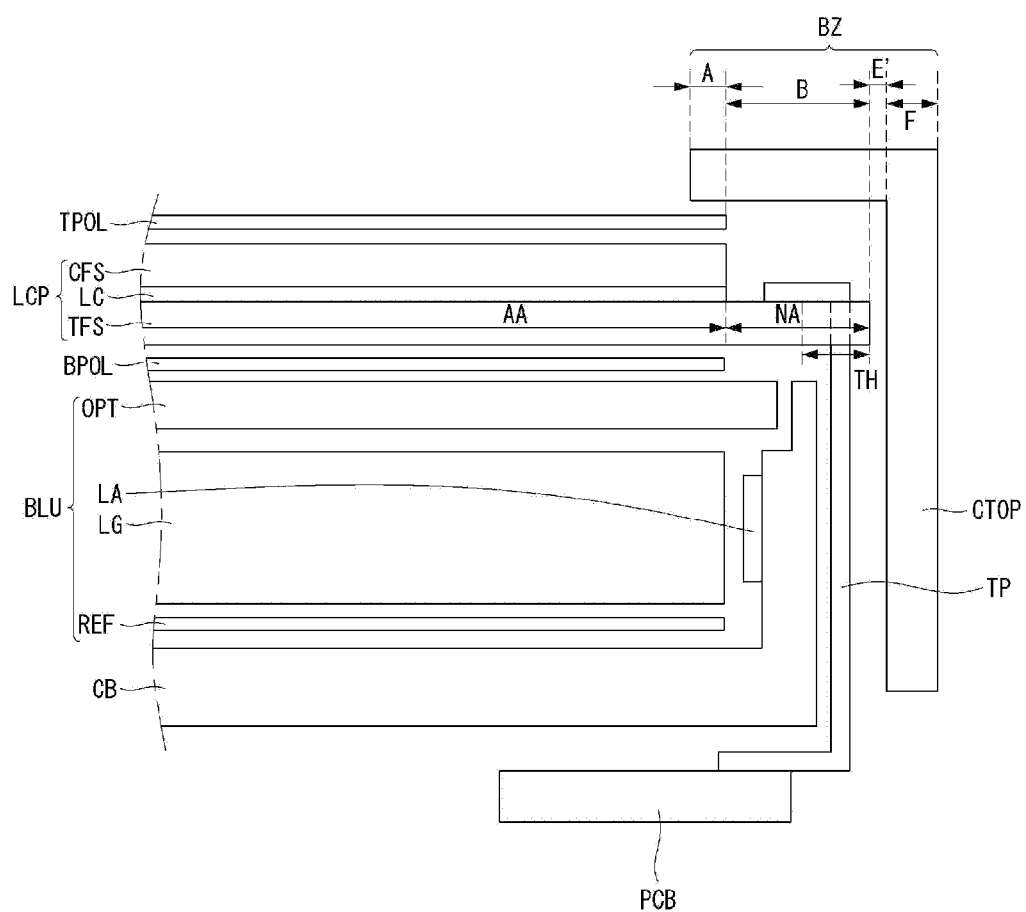

Hereinafter, the liquid crystal display according to embodiments of the present disclosure will be described by reference to FIGS. 3 and 4. FIGS. 3 and 4 are plan views schematically illustrating a structure of a liquid crystal display according to the first exemplary embodiment of the present disclosure.

As illustrated by FIGS. 3 and 4, the liquid crystal display according to an exemplary embodiment of the present disclosure includes a display panel LCP, a backlight unit BLU that emits light to the display panel LCP, and a driving unit that drives the display panel LCP.

The display panel LCP includes a thin film transistor substrate (TFS, or a lower substrate) on which a display area AA and a non-display area NA are defined, a color filter substrate (CFS, or an upper substrate) that is disposed on the display area AA, and a liquid crystal cell LC that is sandwiched between the thin film transistor substrate TFS and the color filter substrate CFS as illustrated by FIG. 4.

A color filter having a pattern of red, green, and blue, or having a pattern of red, green, blue, and white is formed on the color filter substrate CFS. In addition, a black matrix may be further formed thereon.

A plurality of gate lines that are arranged in a first direction and a plurality of data lines that are arranged in a second direction crossing the first direction are formed on the TFS. Further, a plurality of pixel electrodes are arranged in a matrix form in a pixel area defined by the intersection of the gate lines and the data lines. A plurality of thin film transistor substrates TFS that are switched according to a signal of the gate lines to transmit a signal of the data lines to each pixel electrode are formed.

A liquid crystal cell LC is driven by a voltage difference between a pixel electrode that charges a data voltage through a thin film transistor and a common electrode to which a common voltage is applied. The common electrode may be formed on the color filter substrate CFS or on the thin film transistor substrate TFS depending on a driving method of a liquid crystal display.

For an optical function of the display panel LCP, a top polarizer TPOL may be disposed on the front surface of the color filter substrate CFS, and a bottom polarizer BPOL may be disposed on the rear surface of the thin film transistor substrate TFS. For a normally black mode, the top polarizer TPOL and the bottom polarizer BPOL need to be disposed in a manner in which respective light transmission axes thereof cross orthogonal to each other. For a normally white mode, the top polarizer TPOL and the bottom polarizer BPOL need to be disposed in a manner in which respective light transmission axes thereof become in parallel.

The backlight unit BLU is disposed on the rear surface of the display panel LCP, and includes a light source LA that generates light and a light guide plate LG that guides light from the light source LA to the display panel LCP. A reflection sheet REF is disposed on the rear surface of the light guide plate LG, and an optical sheet is disposed on the front surface of the light guide plate LG. The optical sheet OPT may include a diffusion sheet, a prism sheet, or a protective sheet.

A cover bottom CB is disposed on the bottom of the display panel LCP and the backlight unit BLU. The cover bottom CB needs to be formed in a manner that protects and supports the display panel LCP and the backlight unit BLU.

As illustrated by FIG. 3, a driving unit that drives the display panel LCP is provided on at least one end side of the thin film transistor substrate TFS. The driving unit includes a printed circuit board (PCB) to drive the display panel LCP, and a drive integrated circuit (DIC) that is electrically connected to the PCB to supply signals to the display panel LCP. The DIC supplies signals to the gate lines or the data lines through a pad unit formed in the non-display area NA of the thin film transistor substrate TFS. The DIC is mounted on the connection member TP. For example, the connection member TP may be a tape carrier package (TCP), in which one side of the connection member TP is connected to the thin film transistor substrate TFS by tape automated bonding (TAB), and the other side thereof is connected to the PCB. As illustrated in FIG. 4, the PCB may be disposed on the rear surface of the BLU.

Returning to FIG. 3, a recess TH is formed on a one end side OE of the non-display area NA on the thin film transistor substrate TFS. The recess TH may be formed by removing (or cutting) a predetermined area from the end side OE of the thin film transistor substrate TFS.

The recess TH includes a horizontal side H which is spaced apart in parallel from an end side OE of the thin film transistor substrate TFS, and the first and second vertical sides V1 and V2 that are extended from two ends of the horizontal side H toward an end side of the thin film transistor substrate TFS. The connection member TP penetrates the recess TH between the horizontal side H and the end side OE of the thin film transistor substrate TFS. That is, from the front view, the connection member TP needs to be disposed not to protrude from the end side OE of the thin film transistor substrate TFS.

As bending or arching over the rear surface of the recess along the circumference of the horizontal side H, the connection member TP is spaced apart at predetermined distance from the horizontal side (H) of the recess TH. The distance between the connection member TP and the horizontal side H of the recess TH is desirably less than the distance between the end side OE of the thin film transistor substrate TFS and the horizontal side H of the recess TH. That is, the connection member TP is desirably disposed within the inner space of the recess TH so as not to deviate from the non-display area NA of the thin film transistor substrate TFS.

In case that a pad unit formed on non-display area NA has a fixed size, the more length of the first vertical side V1 and the second vertical side V2 increase, the more a size occupied the non-display area NA on the thin film transistor substrate TFS increases. Thus, the first vertical side V1 and the second vertical side V2 desirably have a minimum length as long as the bending connection member TP does not protrude from the non-display area NA.

In addition, when manufacturing the thin film transistor substrate TFS, the pad unit is disposed with a margin area spaced apart from the end side OE of the thin film transistor substrate TFS. After the thin film transistor substrate TFS is manufactured, part of the margin area between the end side OE of the thin film transistor substrate TFS and the pad unit is cut to form a recess TH, thereby resulting in a narrow bezel structure. If the recess TH is first formed on the thin film transistor substrate TFS and then a pad unit is formed on a horizontal side H of the recess TH, the pad unit needs to have a margin area spaced apart from the horizontal side H, and thus, a narrow bezel structure may not be achieved. That is, the pad unit is formed with a margin area from the thin film transistor substrate TFS, and the recess is formed on the margin area, thereby reducing the size of the non-display area NA on the thin film transistor substrate TFS.

The horizontal side H of the recess TH is long enough for the connection member TP to pass through the recess TH, thereby preventing a damage caused by direction friction between the recess TH and the connection member TP having ductility properties.

If necessary, there may be a plurality of connection members, and a plurality of recesses respectively corresponding to a plurality of connection members may be formed on the end side OE of the thin film transistor substrate TFS. At this point, an end side of the non-display area NA of the thin film transistor substrate TFS is formed to have an uneven shape. Further, there may be a plurality of connection members TP and one recess TH through which a plurality of connection members TP pass. In this case, the connection members TP need to be disposed at predetermined distance from each other.

There may be various shapes of the recess. For example, as illustrated in FIG. 3, the horizontal side H of the recess TH and each of the vertical sides V1 and V2 thereof may form a right angle. At this point, the horizontal side H may be long enough for the connection member TP to pass through.

In another example, the horizontal side H of the recess TH and each of the vertical sides V1 and V2 thereof may form an acute angle. In this case, the recess TH may surround the connection member TP that pass through the recess TH, thereby fixing the connection member TP not to be separate from the recess TH.

As illustrated by FIG. 4, a case top CTOP is disposed to cover an edge of the color filter substrate CFS, the thin film transistor substrate TFS, and the driving unit. The connection member TP is disposed to pass through the recess TH so as not to protrude from an end side of the thin film transistor substrate TFS. Accordingly, it is not necessary to secure a sufficient distance between the connection member TP and the case top CTPO to prevent a damage of the connection member TP having ductility properties. That is, it is enough if a processing margin area E, which has a narrow distance between the case top CTPO and the end side OE of the thin film transistor substrate TFS, is secured.

Hereinafter, the liquid crystal display according to the first exemplary embodiment of the present disclosure will be compared with the general liquid crystal display by reference to FIGS. 2 and 4.

Figure 1:
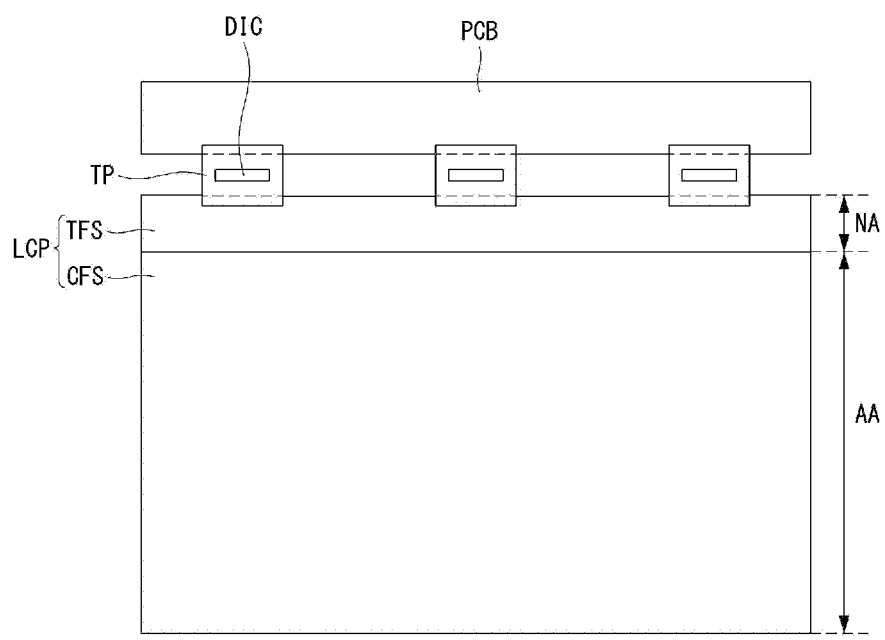
FIGS. 1 and 2 are diagrams illustrating a structure of a general liquid crystal display.
Figure 2:
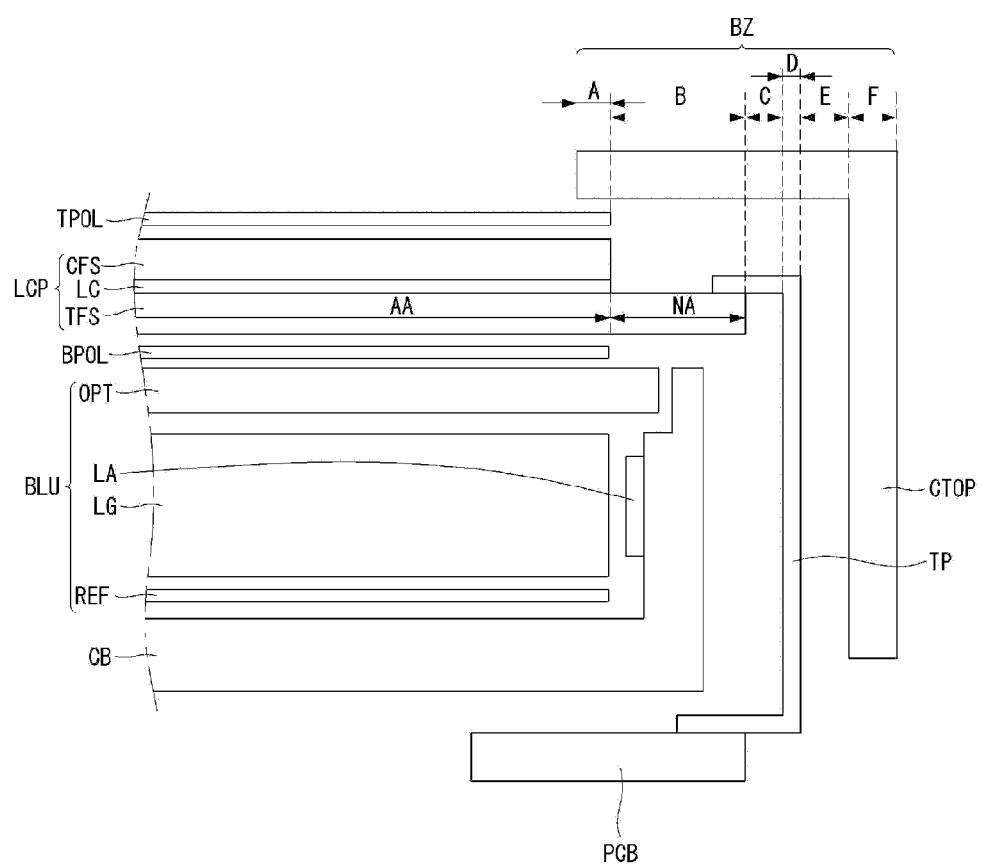

Referring to FIG. 2, the size of a bezel area BZ of the general liquid crystal display is a sum of the following a width A of the edge of the color filter substrate CFS, a width B of the non-display area NA of the thin film transistor substrate TFS, a distance C between an end side of the thin film transistor substrate TFS and the connection member TP, a thickness D of the connection member TP, a distance E between the connection member TP and the case top CTPO, and a thickness F of the case top CTOP.

On the other hand, referring to FIG. 4, the size of a bezel area BZ of the liquid crystal display according to the first exemplary embodiment of the present disclosure is a sum of the following a width A of the edge of the color filter substrate CFS, a width B of the non-display area NA of the thin film transistor substrate TFS, a processing margin area E' between the case top CTOP and the end side OE of the thin film transistor substrate TFS, and a thickness F of the case top CTOP. Accordingly, compared to the bezel area of the general liquid crystal display, the bezel area of the liquid crystal display according to the first exemplary embodiment of the present disclosure may have a reduced distance C between a side of the thin film transistor substrate TFS and the connection member TP (See FIG. 2), a reduced thickness D of the connection member TP (See FIG. 2), and a reduced a distance E between the connection member TP and the case top CTOP (See FIG. 2).

The liquid crystal display according to the first exemplary embodiment of the present disclosure may have a recess TH formed on the end side OE of the thin film transistor substrate TFS, and allows the connection member TP to pass through the recess TH, thereby minimizing the size of the bezel area. In addition, in the present disclosure, the connection member TP having ductility properties is disposed to pass through the recess TH of the thin film transistor substrate TFS, so that direction contact or friction between the connection member TP and as other structure, such as the case top CTOP, may be prevented. Accordingly, it is possible to prevent damage of the connection member TP.

Figure 5:
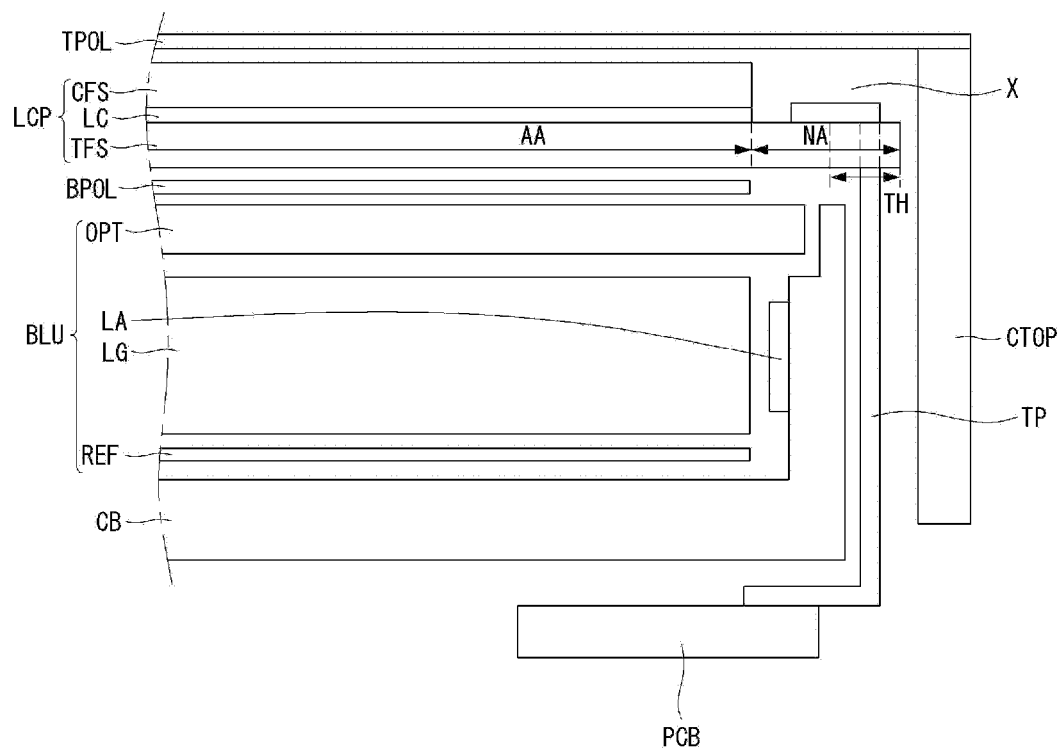
FIG. 5 is a diagram illustrating a structure of a liquid crystal display according to the second exemplary embodiment of the present disclosure.

Hereinafter, a liquid crystal display according to the second exemplary embodiment of the present disclosure will be described by reference to FIG. 5. FIG. 5 is a diagram illustrating a structure of the liquid crystal display according to the second exemplary embodiment of the present disclosure. In the following, descriptions about elements having reference numerals and functions identical to those provided with the liquid crystal display according to the first exemplary embodiment of the present disclosure are omitted for convenience of explanation.

The second exemplary embodiment of the present disclosure may achieve a non-bezel liquid crystal display. For example, a top polarizer TPOL disposed on a color filter substrate CFS may cover even an area of the thin film transistor substrate TFS, the area which is extended longer than the color film substrate CFS. At this point, a case top CTOP may be disposed on the rear surface of one end of the extendedly disposed top polarizer TPOL. The case top CTOP is disposed on the rear surface of the top polarizer TPOL, so that a user cannot see the case top CTOP from the front view.

A step formed between the top polarizer TPOL and the thin film transistor substrate TFS results in a space X, and the space X may be filled with buffer materials or with an additional auxiliary substrate made up of materials identical to those of the color film substrate CFS. By filling the gap between the top polarizer TPOL and the thin film transistor substrate TFS, it is possible to prevent the top polarizer TPOL from coming off. In addition, applying buffer materials may prevent contact between adjacent members, thereby preventing damage of the members. Accordingly, the second exemplary embodiment of the present disclosure may achieve a non-bezel liquid crystal display with a four-surface borderless structure.

However, aspects of the present disclosure are not limited thereto, and the second exemplary embodiment of the present disclosure includes any structure that allows a user not to see the non-display area NA of the color filter substrate CFS, the driving unit, and the case top CTOP from the front view.

In the aforementioned exemplary embodiments, a liquid crystal display is described for convenience of explanation, but aspects of the present disclosure are not limited thereto. Thus, the present disclosure may be applied to any flat panel display which has a driving unit and a display panel separately, wherein the driving unit is mounted on the rear surface of the display panel.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A flat panel display comprising:
a display panel comprising a thin film substrate, the thin film substrate including a display area and a non-display area which is disposed on an outside of the display area, the display area displaying images and the non-display area not displaying images, the non-display area of thin film substrate comprising at least one recess in the non-display area, the at least one recess extending through a thickness of the thin film substrate, wherein a predetermined area from an outermost edge of the non-display area towards the display area of the thin film substrate is removed from the non-display area to form the at least one recess;
a driving substrate that drives the display panel, the driving substrate disposed on a rear surface of the display panel; and
at least one connection member connected to the display panel and the driving substrate, a portion of the at least one connection member disposed within the at least one recess and a drive integrated circuit electrically connected to the driving substrate and mounted on the portion of the at least one connection member that is disposed within the at least one recess.

2. The flat panel display of claim 1, wherein the display panel further comprises:
an upper substrate disposed on the display area wherein the thin film substrate includes at least one thin film transistor.

3. The flat panel display of claim 1, wherein the at least one recess comprises a horizontal side spaced apart in parallel from the one end side of the non-display area, and at least one connection member is disposed between the one end side of the non-display area and the horizontal side.

4. The flat panel display of claim 1, wherein the at least one connection member passes through the at least one recess.

5. The flat panel display of claim 1, wherein the at least one connection member includes two or more connection members, and wherein the two or more connection members pass through the at least one recess.

6. The flat panel display of claim 1, wherein the at least one recess includes a first vertical side, a second vertical side, and a horizontal side, wherein the first vertical side and the second vertical side are disposed towards the display area, and wherein the horizontal side includes a first end and a second end, the first end connected to the first vertical side, and the second end connected to the second vertical side.

7. The flat panel display of claim 6, wherein the horizontal side and at least one of the first vertical side and the second vertical side form a right angle.

8. The flat panel display of claim 6, wherein the horizontal side and at least one of the first vertical side and the second vertical side form an acute angle.

9. The flat panel display of claim 1, wherein the at least one connection member does not extend past the outermost edge of the non-display area of the thin film substrate.

* * * * *